Patented Dec. 24, 1929

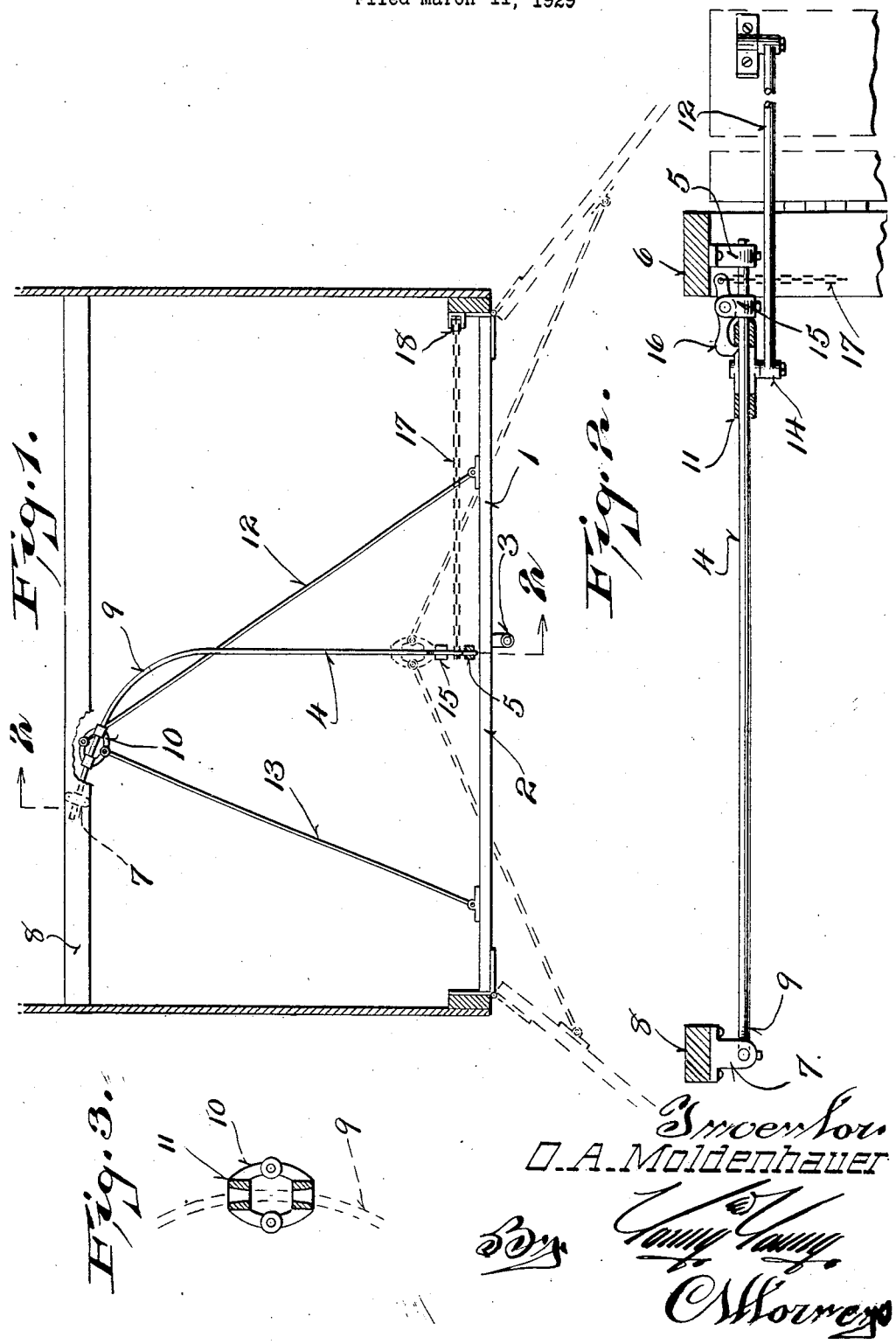

1,740,951

UNITED STATES PATENT OFFICE

OTTO A. MOLDENHAUER, OF MILWAUKEE, WISCONSIN

SELF-LOCKING DOOR-CONTROL DEVICE

Application filed March 11, 1929. Serial No. 346,047.

This invention relates to a self-locking door control device.

Objects of this invention are to provide a novel form of door control device for hingedly mounted doors having meeting edges, such device being constructed to automatically lock one of said doors and permit the control of such locked door by the other door, so that the last mentioned door may be freely opened or closed to thereby open or close the other of said doors.

Further objects are to provide a construction in which a trolley is carried by a track having an offset curved portion and in which the trolley is joined to the doors by means of links, the device permitting positioning of one end of the track adjacent the meeting edges, so that one of the doors may open more than the other, as required, or so that both doors may open equally.

Further objects are to provide a device having the characteristics enumerated above which is of extremely simple construction and has few parts, which may be cheaply manufactured, and which is substantially foolproof in its operation.

An embodiment of the invention is shown in the accompanying drawings in which:

Figure 1 is a plan view of the device with parts of the adjacent portions of the garage or house broken away and in section;

Figure 2 is a sectional view on the line 2—2 of Figure 1;

Figure 3 is a horizontal sectional view through the trolley.

Referring to the drawings, it will be seen that the device is applied to a pair of hingedly mounted doors 1 and 2, which are hinged adjacent the outer edges and which have meeting edges. One of the doors, for instance, the door 1, may be considered the master door and is preferably provided with a handle or latch 3 by means of which it may be manipulated.

A track 4 has its ends secured rigidly in place, one of such ends being secured by means of a bracket 5 attached to the upper portion of the door casing 6. The other bracket 7 is attached to any suitable support, as indicated by the reference character 8, rearwardly of the doors and offset with reference to the center line passing between the doors. The track is substantially straight throughout the major portion of its extent and has a curved laterally offset portion 9, as shown in Figure 1. This laterally offset portion may extend in either direction desired. In the form shown, it extends towards the door 2. However, if the door 2 is to be the master door, it is obvious that the track should extend to the right and the handle 3 be applied to the door 2.

The track slidably carries a trolley 10 which as may be seen from Figure 3, is provided with spaced apertured ends 11 which freely receive the track. Preferably, the track is formed of somewhat resilient material to provide a slight yield.

The trolley is connected to the doors 1 and 2 by means of the links 12 and 13. Preferably, these links are attached to opposite sides of the trolley and, as shown in Figure 2, are provided with bosses 14 at their ends so as to space the links below the track and trolley.

From the description thus far given, it is clear that when the master door is opened, that the link 12 pulls the trolley along the curved portion and onto the straight portion of the track. During the motion of the trolley along the curved portion, there is practically no motion imparted to the door 2, as the link merely swings about its pivot point at the door 2 and the trolley thus moves freely along the curved portion without opening the door. However, as the trolley progresses in its travel, the door 2 is swung open and finally, with the parts in the position shown in Figure 1, opens both doors to substantially the same extent.

It is obvious that the bracket 5 could be attached not directly opposite the meeting edge of the doors as shown in Figure 1, but could be attached to the right or to the left of this point. Thus, if it were attached to the left, the door 2 would be given a greater opening motion than the door 1, and obviously the reverse would be true if it were attached to the right. This is sometimes desirable as, for instance, when there is an obstruction adjacent one door and it is desired to open the other door to a greater extent.

The track carries a bracket 15 (see Figure 2) which carries a latch 16 having a pointed end provided with a cam face and adapted to drop down into a portion of the trolley to thus lock the doors in open position. This latch is tripped by means of a chain 17 attached to the outer end of the latch and preferably extending downwardly below the track and thereafter laterally and passing over a pulley 18 adjacent the hinged end of the door 1, to thus position the tripping chain within ready reach of the operator when he manipulates the door 1.

It is to be noted further that if any wind is blowing across the open doors, that the tendency to close due to the pressure upon one door is resisted by the tendency to open due to the pressure against the other door. Thus, the wind pressure is substantially balanced by this construction.

It will be seen further that the device is very easy to manipulate and is of simple, easily produced and rugged construction.

Although the invention has been described in considerable detail, such description is intended as illustrative rather than limiting as the invention may be variously embodied and as the scope of such invention is to be determined as claimed.

I claim:

1. The combination of a pair of hinged doors having meeting free edges, a track, a trolley carried by said track, links extending from said trolley to said doors, said track having a laterally extending curved portion approximately at right angles to the link from one of said doors when the trolley is on such portion of said track.

2. The combination of a pair of hinged doors having meeting edges, a track extending from approximately adjacent the meeting edges of said doors, said track having a laterally extending curved portion, a trolley carried by said track, and links extending from said doors to said trolley.

3. The combination of a pair of hinged doors having meeting edges, a track extending from approximately adjacent the meeting edges of said doors, said track having a laterally extending curved portion, a trolley carried by said track, and links extending from said doors to said trolley, said track being secured adjacent its ends and being slightly resilient.

4. The combination of a pair of hinged doors having free meeting ends, a track having ends rigidly held in place and having one end approximately adjacent the meeting point of the doors, said track having a straight portion extending rearwardly from said doors and having a laterally extending curved portion, a trolley carried by said track, and a pair of links extending from said doors to opposite sides of said trolley.

5. The combination of a pair of hinged doors having meeting free edges, a track extending rearwardly from approximately the meeting edges of the doors and having a laterally extending curved portion providing an offset rear end, a trolley slidably carried by said track, links extending from said trolley to said doors, a latch adjacent the forward end of said track for engaging said trolley, and a flexible tripping member extending from said track to adjacent the hinged portion of one of said doors.

In testimony that I claim the foregoing I have hereunto set my hand at Milwaukee, in the county of Milwaukee and State of Wisconsin.

OTTO A. MOLDENHAUER.